(12) United States Patent
Swan et al.

(10) Patent No.: US 10,659,724 B2
(45) Date of Patent: May 19, 2020

(54) METHOD AND APPARATUS FOR PROVIDING DROPPED PICTURE IMAGE PROCESSING

(75) Inventors: Philip L. Swan, Richmond Hill (CA); Stephen J. Orr, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 13/216,747

(22) Filed: Aug. 24, 2011

(65) Prior Publication Data
US 2013/0050572 A1 Feb. 28, 2013

(51) Int. Cl.
*H04N 7/01* (2006.01)
*H04N 7/00* (2011.01)

(52) U.S. Cl.
CPC .......... *H04N 7/0127* (2013.01); *H04N 7/014* (2013.01); *H04N 2213/008* (2013.01)

(58) Field of Classification Search
CPC ......... H04N 7/01; H04N 5/145; H04N 7/0127
USPC .................................................. 348/441, 699
See application file for complete search history.

(56) References Cited

U.S. PATENT DOCUMENTS

| | | | | |
|---|---|---|---|---|
| 2005/0254584 A1* | 11/2005 | Kim | ........................ | H03M 7/30 375/240.27 |
| 2006/0170822 A1* | 8/2006 | Baba | ..................... | G09G 3/3406 348/500 |
| 2007/0242080 A1* | 10/2007 | Hamada | ................. | G09G 5/006 345/606 |
| 2008/0007614 A1* | 1/2008 | Mizuhashi | ............... | G09G 5/00 348/14.01 |
| 2008/0151109 A1* | 6/2008 | Doswald | .............. | H04N 7/0115 348/459 |
| 2009/0268823 A1* | 10/2009 | Dane | ....................... | H04N 19/61 375/240.27 |
| 2009/0279615 A1* | 11/2009 | Au et al. | ................... | 375/240.27 |
| 2010/0149422 A1* | 6/2010 | Samuelsson | ......... | H04N 19/139 348/699 |
| 2010/0166079 A1* | 7/2010 | Goel | .................... | G11B 27/005 375/240.25 |
| 2010/0231797 A1 | 9/2010 | Jiang et al. | | |
| 2010/0245672 A1* | 9/2010 | Erdler | .................. | H04N 19/139 348/608 |
| 2011/0157315 A1* | 6/2011 | Bennett et al. | ................. | 348/46 |

* cited by examiner

Primary Examiner — Jefferey F Harold
Assistant Examiner — Justin B Sanders
(74) *Attorney, Agent, or Firm* — Faegre Drinker Biddle & Reath LLP

(57) ABSTRACT

A method and apparatus adaptively creates a dropped frame rate converted frame from a plurality of source frames using at least one alternate support frame in lieu of a neighboring source frame, in response to corrupted picture identification information. Stated another way, a frame rate converter, in response to corrupted picture indication information, replaces at least one corrupted source frame with a temporally modified frame created from at least one alternate source frame. The corrupted picture identification information indicates that a source frame, or segment thereof, includes at least one corrupted or dropped source frame (or segment thereof).

17 Claims, 7 Drawing Sheets

METHOD AND APPARATUS FOR PROVIDING DROPPED PICTURE IMAGE PROCESSING

BACKGROUND OF THE DISCLOSURE

The disclosure relates generally to apparatus and methods that perform frame rate conversion and more particularly to methods and apparatus that perform frame rate conversions using source frames from a decoder.

Video display systems such as high definition televisions, laptop computers, handheld devices, or any other devices, process encoded video streams whether encoded in an MPEG format or any other suitable format to produce decoded video frames. As used herein, the term frame will be used although it will be understood that fields are also covered by this term. As decoders decode streams of video information, they may have difficulty in outputting frames that have a rate desired by a display or display subsystem. If a decoder does not properly decode a frame (e.g., CPU is too busy to decode or control decoder properly), a "dropped" frame condition occurs or a corrupted frame is generated. The decoder then typically repeats a previously decoded frame as the dropped frame. This is sometimes referred to as a "repeated last frame" approach. This can be unsatisfactory, however, because the smoothness of any motion in the scene can be disrupted.

Frame rate conversion is the process of converting decoded source frames that are being output by a decoder, for example, at a 24 Hz rate, to different rate of frames, for example, at a 60 Hz rate. The frame rate conversion process is done as part of a post-decode operation after the frames have been decoded by a decoder. Frame rate conversion in this example requires a differing number of frames to be generated from the source frames and multiple source frames are used to generate each frame rate converted frame. However, if the decoder provides a repeated last frame because the prior frame was dropped or if the decoder outputs a corrupted frame, the resulting video can have poor quality (e.g., poor apparent motion if motion is in the scene). The repeated last frame approach can result in the disturbance in cadence caused by dropped frames.

Accordingly, it would be desirable to have an improved method and apparatus that better handle dropped frame conditions or corrupted frame conditions in a frame rate conversion process.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Figure 1:
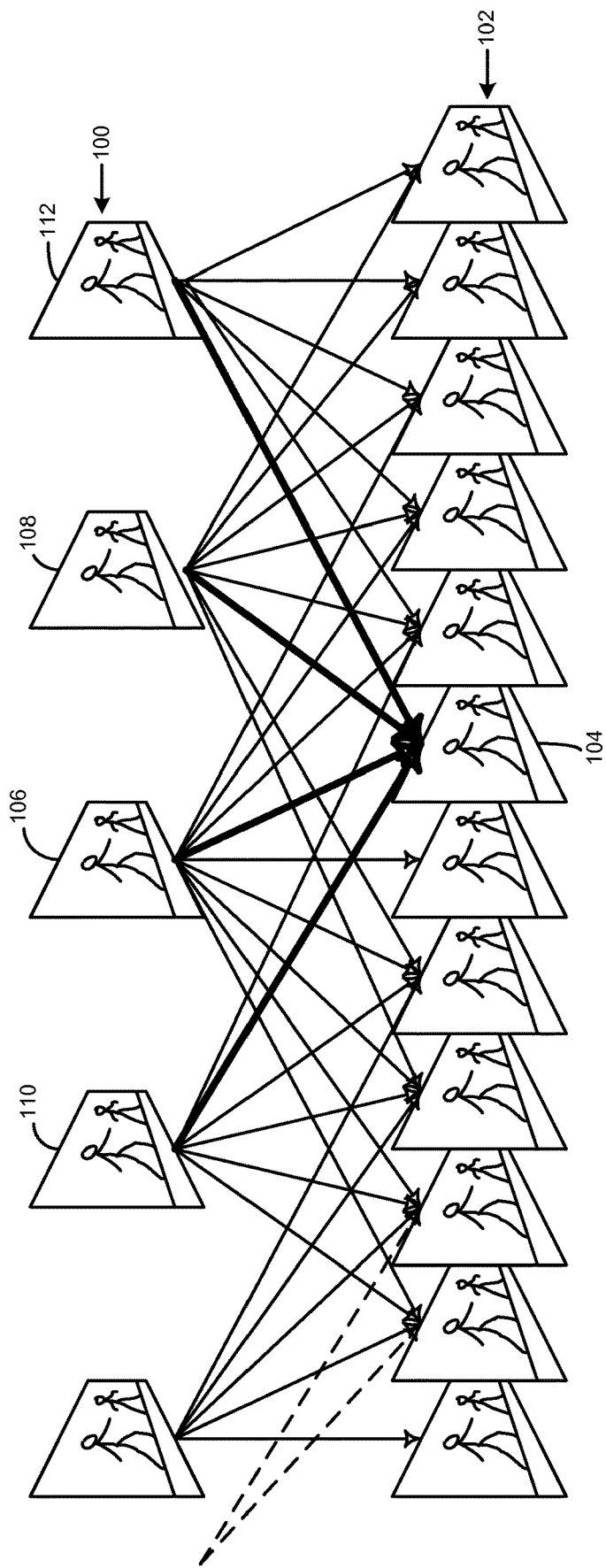
FIG. 1 is a diagram illustrating a frame rate conversion process.

Briefly, a method and apparatus adaptively creates a dropped frame rate converted frame from a plurality of source frames using at least one alternate support frame in lieu of a corrupted or repeated source frame, in response to corrupted picture identification information. For example, a frame rate converter, in response to corrupted picture indication information, replaces at least one corrupted source frame with a temporally modified frame created from at least one alternate source frame. The corrupted picture identification information indicates that a source frame, or segment thereof, includes at least one corrupted or dropped source frame (or segment thereof). Accordingly, although a source frame has been dropped or is corrupted, the frame rate converter does not base its output on a repeated frame or a corrupted frame output by a decoder and instead utilizes alternate support frames such as other non-neighboring source images. In one example, four source frames are used to generate a dropped frame rate converted frame. In this example, two past neighboring frames and two future non-neighboring frames are used. That is, the nearest two valid future and nearest two valid past frames are used. The two future and two past valid frames are relative to the time index of the output frame to support the FRC operation. In normal operation, the frame rate converter also uses four frames but uses the neighboring previous and future frames as well as earlier previous and future sequential frames. A smoother video sequence can thereby be produced.

In one example, a frame rate converter selects neighboring sequential post and future source frames for use in producing a normal frame rate converted frame during a normal mode and switches to adaptively creating the dropped frame rate converted frame (also referred to as a temporally modified frame) using at least one non-sequential and alternate support frame as though it were a neighboring source frame, during a frame drop/corruption. Accordingly, the frame rate converter dynamically switches modes from using a normal frame rate conversion operation to switching to creating dropped frame rate converted frames using alternate support frames as though they were neighboring source frames when, for example, it is detected that a dropped frame or corrupted frame has been generated by a decoder.

In one example, the frame rate converter generates the corrupted picture indication information. In another embodiment, the decoder may be equipped to generate the corrupted picture indication information. In another embodiment, a processor or other suitable logic can generate the corrupted picture indication information. Generation of the corrupted picture indication information, irrespective of which component generates it, may include detecting a time stamp discontinuity among time stamps from each of a plurality of source frames, or the corrupted picture indication information can indicate that a decoded frame is missing or corrupted based on object movement information such as tracking of an object in a frame across multiple frames. Alternatively or in addition to these operations, the corrupted picture indication information may be generated based on image change discontinuity among a plurality of source images.

In one example, the frame rate converter is operative to generate the dropped frame rate converted frame using alternate support frames by generating motion vector information based on motion estimation information from alternate support frames. In another example, the decoder may be operative to generate the corrupted picture indication information based on the determination that a dropped frame condition occurred where the corrupted frame was produced by the decoder such as the decoder running CRC algorithms on the data it is decoding or other conventional techniques used by decoders. The decoder may store the decoded source frames along with any corrupted picture indication information with each of the source frames as a tag data in memory if desired. Alternatively, the corrupted picture indication information may be stored in a status register or be passed along any suitable signaling lines to the frame rate converter.

FIG. 1 diagrammatically illustrates a prior art frame rate conversion process of source frames 100 into a series of frame rate converted frames 102. In this example, the source frames 100 are 24 Hz rate of frames (or fields) and the resulting series of frame rate converted frames 102 are individual frame rate converted frames that are output at a 60 Hz rate which may be, for example, the display rate of a high definition television or other suitable display. As shown in this example, the generated frame rate converted frame 104 is produced using information from four source frames. In this example, a neighboring previous frame 106 and a neighboring future frame 108 are sequential and adjacent frames output from the decoder. In addition, earlier sequential previous frame 110 is employed as well as a further sequential future frame 112. As such, four sequential frames are used, two adjacent previous frames and two adjacent future frames to generate the frame rate converted frame 104. As shown, more frames are generated from fewer frames 100.

As shown, the frame rate converted frame 104 is produced with four sequential frames: a neighboring previous frame 106, a neighboring future frame 108 as well as previous frame 110 which is prior to previous frame 106 and future frame 112 which is further in time from future frame 108. The frame rate converted frames are produced using motion compensated information from the four frames 106, 108, 110 and 112 using known motion compensation techniques.

The source frames 100 are provided by a decoder that decodes encoded frames. The decoder, for example, may be an MPEG decoder or any other suitable decoder. The resulting frame rate converted frames 102 are produced by the frame rate converter which may be, for example, a suitably programmed processor, discrete hardware, or any suitable combination of executing software and hardware as known in the art.

Figure 2:
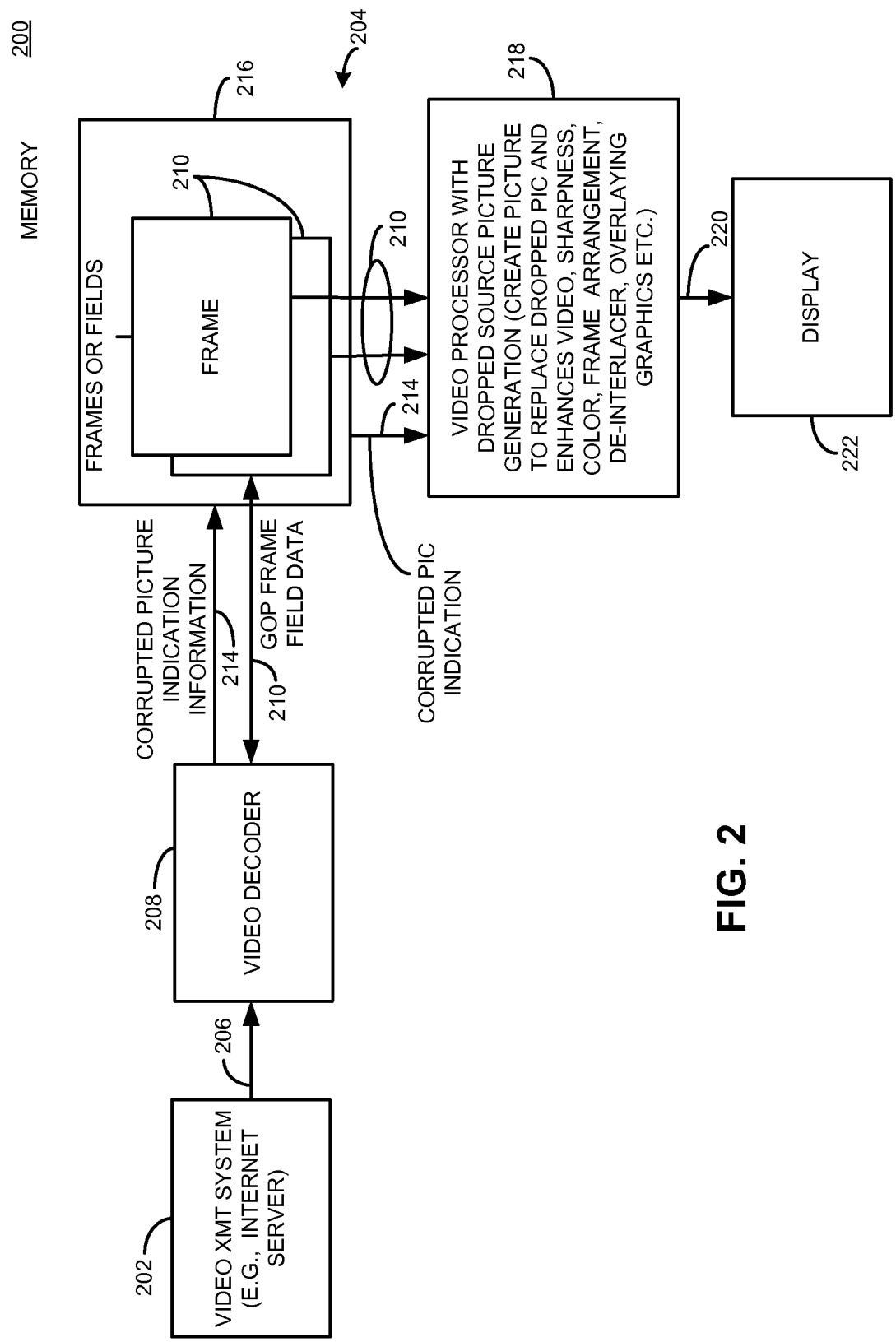
FIG. 2 is a block diagram illustrating one example of a video system that employs an apparatus with an improved frame rate converter in accordance with one example set forth in the disclosure.
Figure 3:
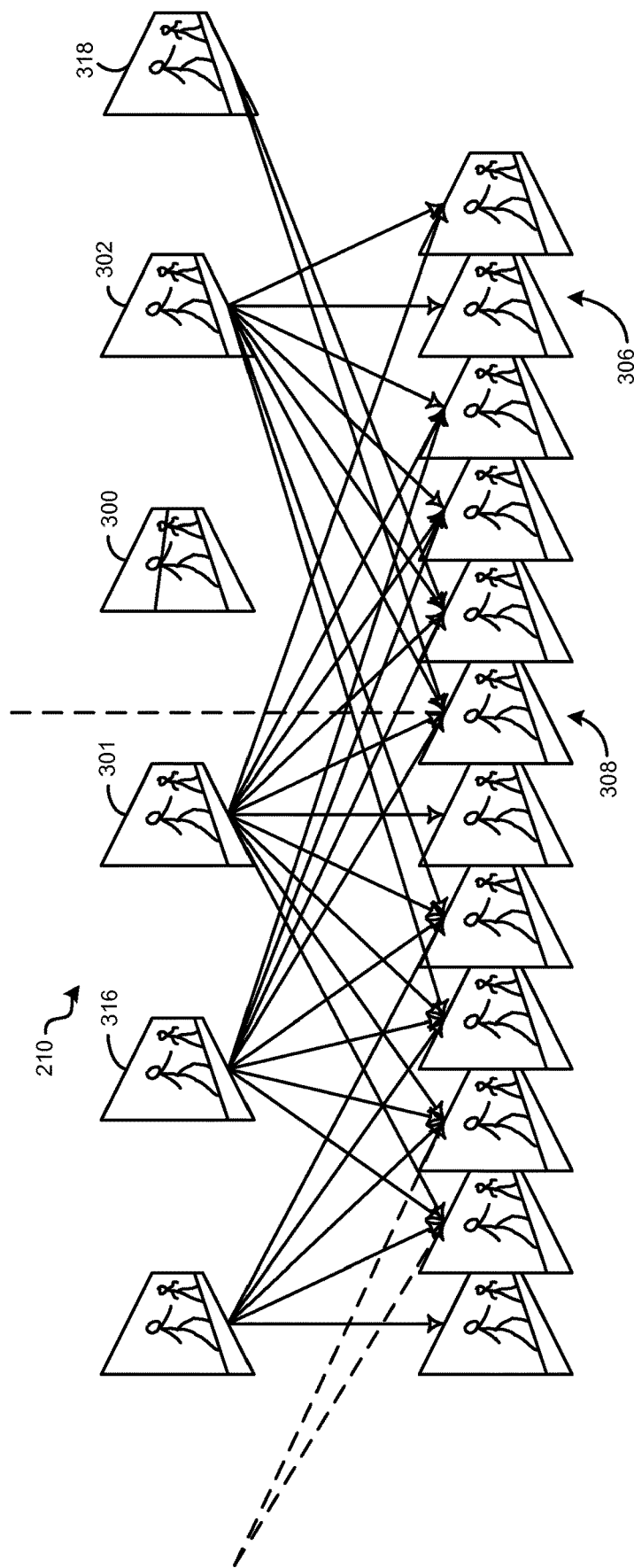
FIG. 3 is a diagram illustrating a corrupted or dropped frame condition and a frame rate conversion process in accordance with one example set forth in the disclosure.

Referring to FIGS. 2 and 3, a video display system 200 may employ, for example, an encoded video source device 202 such as an Internet web server, satellite, cable head end, DVD, or any other suitable source of encoded video information. An apparatus 204, such as an HDTV, laptop, smart phone or other device displays the encoded video 206 provided by the video source 202 to a video decoder 208. The video decoder 208 decodes the encoded stream of frames 206 and outputs a decoded series of frames as source frames 210 which may be packetized as a group of picture (GOP). The decoder 208 may produce a corrupted source frame or otherwise drop a frame. In this example, the decoder includes logic that provides corrupted picture indication information 214 that may be, for example, linked with a respective source frame 210 that is stored in memory 216. The corrupted picture indication information indicates that a particular frame is corrupted or that a frame has been repeated due to a dropped frame condition. Alternatively, the information 214 may indicate that a frame was dropped and no repeated frame has been stored in memory 216.

The apparatus 204 also includes a video processor 218 that obtains the stored decoded source frames 210 and performs frame rate conversion to provide frame rate converted frames 220 for a display 222. The display 222 displays the temporally temporally modified frame. In this example, the video processor 218, may be a CPU, GPU, such as an ATI Radeon GPU, made by ATI Technologies Inc. or any other suitable logic. The vide processor obtains the corrupted picture indication information 214 in addition to the source frame information 210. In this example, the source frames 210 may be stored to include the corrupted picture indication information as part of the source frame information in memory 216. Alternatively, the corrupted picture indication information may be passed to the video processor as part of a different signal or may be stored in a suitable status register as desired. The register may be populated by the video decoder 208.

The video processor 218 in addition to performing frame rate conversion may also provide video enhancement by applying known video enhancement algorithms to increase, for example, the sharpness of the frames, color, perform deinterlacing, perform overlaying of graphics or may perform any other suitable video processing operations as known in the art.

The video decoder 208 may be any suitable video decoder that decodes encoded frames such as, but not limited to, encoded MPEG streams. The memory 216 may be any suitable memory including RAM, ROM, or any other suitable memory that stores digital information for purposes of illustration. The video processor 218 may be a graphics processor that includes one or more graphics cores. Alternatively, a central processing unit that includes one or more processing cores, or any other suitable video processor may perform the operations described herein. As used herein, the term processor may include hardware, such as discrete logic such as state machines that performs the operations described herein, programmable processors that execute instructions that are stored in memory such that when they are executed by the processor, the processor performs the operations described herein, or any other suitable combination of hardware and programmable processor operation.

Figure 5:
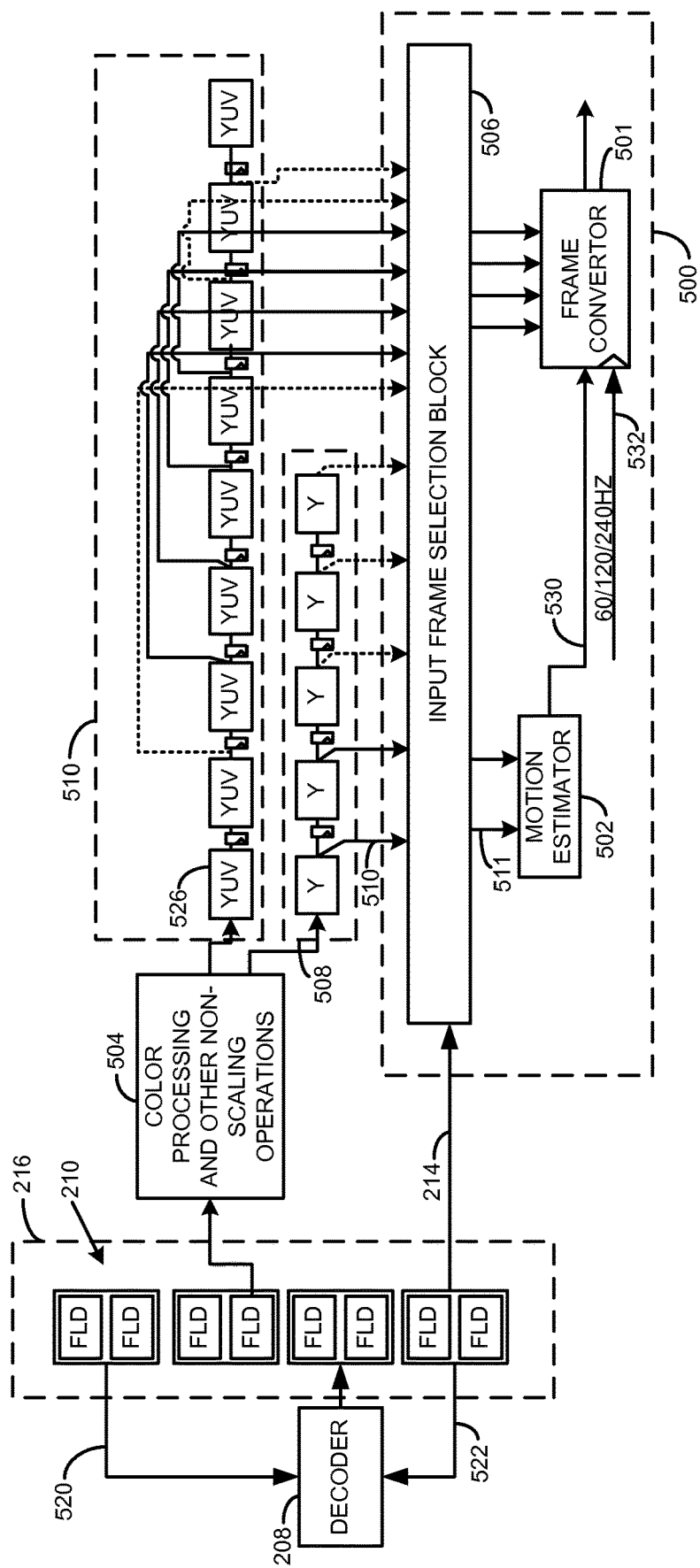
FIG. 5 is a block diagram illustrating one example of an apparatus that employs a decoder and functional blocks in accordance with one example set forth in the disclosure.

Referring to FIGS. 3 and 5, the source frames 210 output by video decoder 208 include in this example a corrupted frame 300 which may also be considered as a dropped frame. Source frame 301 and 302 are not neighboring frames since non-neighboring frame 302 is not temporally adjacent to frame 301. The video processor 218 includes a frame rate converter 500 that produces the frame converted frames 306. In this example the frame rate converter 500 produces a dropped frame rate converted frame (also referred to as a temporally modified frame created from at least one alternate source frame) 308 in an adaptive manner and creates the dropped frame rate converted frame (i.e., temporally modified frame) 308 from the source frames 210 using at least one alternate support frame 302 and does not use the neighboring corrupted frame 300 or a repeated or missing frame that would be neighboring to the dropped frame rate converted frame 308. The frame rate converter 500 creates the dropped frame rate converted frame 308 using four frames but instead use neighboring previous frame 301, previous frame 316, non-neighboring next frame 302 and future frame 318 as source frames to produce the dropped frame rate converted frame 308. As such, the frame rate converter 500 selects neighboring source frames for use in producing a normal frame rate converted frame (see FIG. 1) during a normal operation such as when no dropped frames or corrupted frames are produced by the decoder, but switches to adaptively creating the dropped frame rate converted frame 308 using at least one alternate support frame 302 in lieu of an invalid neighboring source frame during another mode. Mode change is based on the corrupted picture indication information indicating that a corrupted or dropped frame has occurred. A valid frame is a non-corrupted image and non-repeated image in the case where the decoder substituted a repeated image for a corrupted image. A repeated image (or another copy of an image at the same time stamp) would be considered a redundant image since it does not provide any new information that can be used to determine the motion of objects in the scene. It will be recognized that sometimes a repeated image could still be used by an algorithm if was transmitted separately and has different noise on it. It doesn't help satisfy an FRC process that used four support frames but it can be used by noise reduction and cadence detection algorithms. It will be recognized that some kinds of repeated frames may be additionally fed to the Frame Rate Convertor (501) if that frame rate convertor also does noise reduction, for example. As the decoder produces uncorrupted frames the frame rate converter 500 goes back to using four sequential frames as shown for example in FIG. 1.

Figure 4:
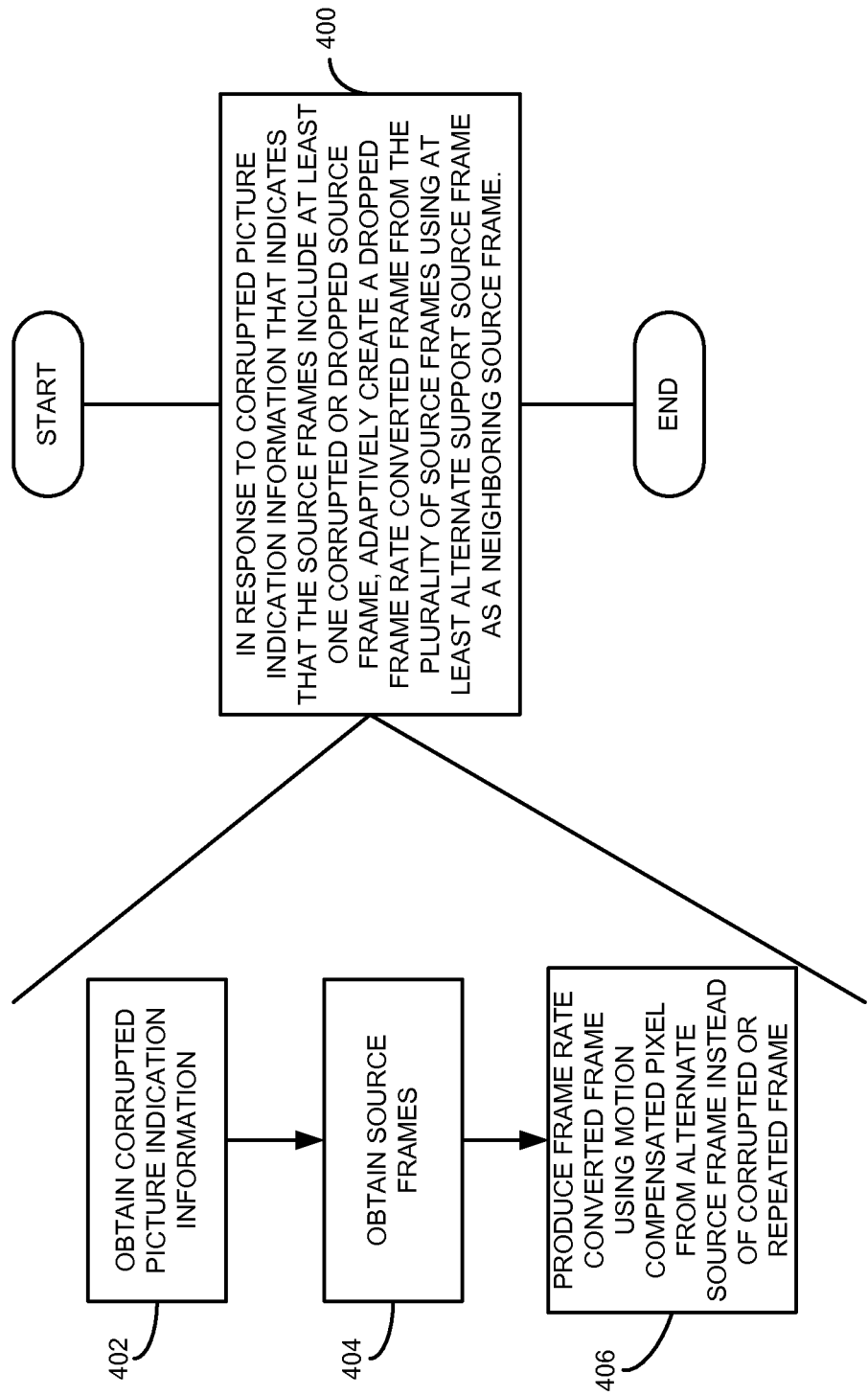
FIG. 4 is a flowchart illustrating one example of a method for providing frame rate conversions of source frame in accordance with one example set forth in the disclosure.

FIG. 4 is a flowchart illustrating a method for producing a frame rate converted frame 308 from a plurality of source frames which may be carried out for example by the video processor 218 that employs a frame rate converter. However, any other suitable structure may also be employed. As shown, the method includes, in response to corrupted picture indication information 214 that indicates that the source frames include at least one corrupted or dropped source frame (invalid frame), adaptively creating a dropped frame rate converted frame 308 from the plurality of source frames using at least one alternate support frame 302 in lieu of neighboring source frame in the generation of the dropped frame rate converted frame 308. This is shown in block 400. As also shown, the method may include obtaining the corrupted picture indication information 214 either locally from a frame rate converter's own analysis of source frames stored in memory, or obtaining the information 214 from the video decoder either directly or having information stored in memory with the source frames. This is shown in block 402. As shown in block 404, the method includes obtaining the appropriate source frames 210 to produce the dropped frame rate converted frame. The appropriate source frames in this example do not include using both of the neighboring source frames. Instead, an alternate support frame 302 is used in lieu of an invalid neighboring frame 300. As shown in block 406, analysis is performed on the frame 302 to move pixels to an estimated point as to where they would have believed to have occurred in frame 300 namely the dropped or corrupted frame. This is done by performing motion compensation operations on the pixels in the alternate support frame 302. The resulting motion compensated pixels from the alternate support frame 302 are then employed in a blending operation to produce the dropped frame rate converted frame 308 using information from the frames 301, 316 and 318. By way of another example, if frame 302 were invalid the apparatus would use frames 300 and 318.

FIG. 5 is a block diagram illustrating one example of a portion of the video processor 218 and decoder 208 that employs a frame rate converter 500, motion estimator 502, a color processing block 504, an input frame selection block 506, Luminance storage block 508, and source frame store 510. It will be recognized that the source frame store 510 need not be used if desired and instead the source frames can be directly obtained from the decoder frame store shown as 216. The term field or frame is used interchangeably as the apparatus is equally applicable as to whether the source images are source frames or source fields.

In operation, the decoder 208 decodes encoded video 206 to produce the source frames 210 and may determine whether a frame was dropped or a corrupted frame has been stored using known techniques. However, this detection may also be done by any other suitable component other than the decoder if desired. The color processor 504 performs color processing or other non-scaling operations on the decoded source frames 210 if desired. The processed source frames are then stored in the source frame stores 510 as YUV image frames 526 in this example.

The luminance storage block 508 stores luminance values 510 of the images which are input to the input frame selection block 506. The input frame selection block 506 is also operative to dynamically select which source frames are to be used by the frame rate converter 500 and the luminance values 510 that are passed to motion estimator 502 as selected luminance values 511. In this example, four frames are used. However, any suitable number can be used. The input frame selection block 506 includes control logic to determine which four frames to use and adaptively changes modes of operation to include four sequential output source frames in normal operation such as sequential two previous and two additional subsequent frames. When a dropped frame or corrupted frame indication is indicated by the corrupted picture indication information 214, the input frame selection block 506 instead selects at least one alternate source frame (e.g. next consecutive valid frame) as input to produce the dropped frame rate converted frame. The motion estimator 502 analyzes the luminance values 511 and produces information that describes the optical flow of the video. The motion estimator 502 outputs optical flow information 530 that describes how objects in the scene move to the frame converter 501. The frame converter 501 may be controlled by rate control information 532 to output frame rate converted frames at any suitable rate. The frame rate converter 500 includes the input frame selection block 506, the motion estimator 502 and the frame converter 501 in this example. The frame converter 501 takes source frames and produce the frame rate converted frame 308 in response to the motion compensation information 530.

The corrupted picture indication information 214 may be based on any suitable information. By way of example and not limitation, generation may be based on detecting a time stamp discontinuity among time stamps for each of a plurality of source frames as further set forth below, based on object movement information across frames if desired or based on an image change discontinuity among a plurality of source images. The information is determined from source images that are not corrupted or missing. This detection may be performed by the frame rate converter 501, by the decoder, or any other suitable component. The frame rate converter 500 in this example utilizes four source frames and adjusts motion vector information to obtain pixel information through, for example, texture coordinate generator and texture fetches where the frames are stored as understood by graphics processor, to obtain pixel information from an alternate support frame instead of the corrupted or duplicated frame. The alternate source pixel information is used to generate the dropped frame rate converted frame. The input frame selection block 506 switches dynamically as required to accommodate missing or corrupted frames in response to the corrupted picture indication information 214.

Figure 6:
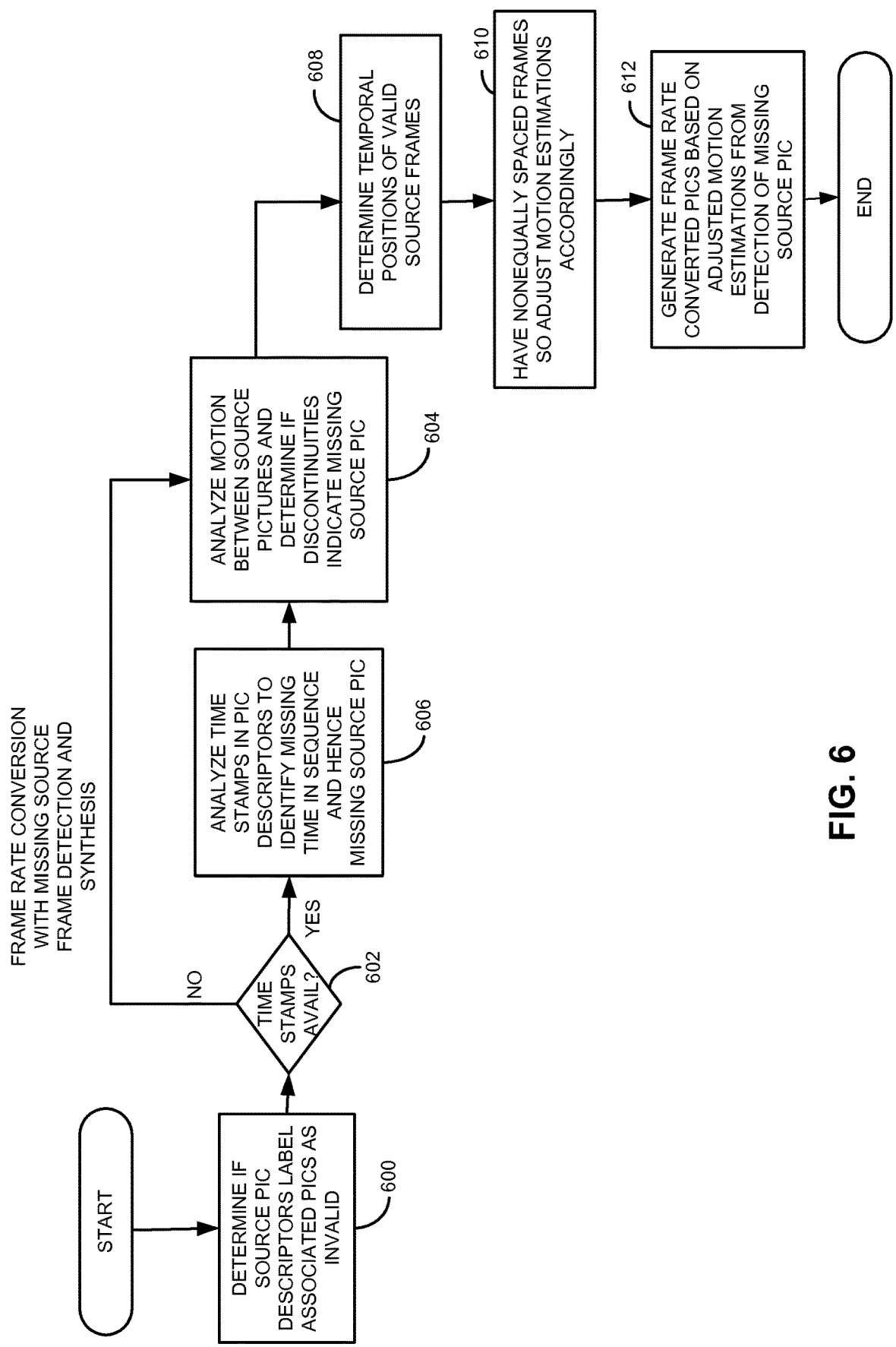
FIG. 6 is a flowchart illustrating one example of a method for providing frame rate conversion in accordance with one example set forth in the disclosure.

FIG. 6 is a method for generating frame rate converted frames in accordance with one example. As shown in block 600, the method includes determining if a source frame descriptor label 214 indicates that one or more source frames are invalid. For example, if the decoder outputs packet information and header information is associated with a given frame, the header information may include information 214 representing whether the output frame is invalid such as corrupted. If this information is not available, as shown in block 602, the method may include determining if time stamps are available for the frames. If not, then the detection may analyze motion between objects in source frames and determine if discontinuities exist indicating a missing source picture or a corrupted source frame. This is shown in block 604. If time stamps are available, then the method may include analyzing time stamps in the frame descriptors to identify missing times and sequence and therefore missing source frame in a sequence of frames. This is shown in block 606. Accordingly, differing mechanisms may be employed or a combination of one or more of the above may be used depending upon the type of system and analysis desired.

For example, if time stamps are not available, then motion may be analyzed either alone or in addition to time stamp information. Additional analysis may help confirm whether or not the time stamp analysis was correct if time stamp information exists. Once the detection of a corrupted picture is found so that the corrupted picture indication information 214 indicates a corrupted picture exists, a conclusion is made that a missing picture or corrupted frame exists. The method may include determining the temporal positions of valid source frames as shown in block 608. Also since there are non-equally spaced frames (non-sequential, non-neighboring) since one or more frames have been determined to be corrupted or missing, motion estimations are adjusted accordingly using the valid source frames to estimate the motion that would have occurred in the corrupted or missing frame as shown in block 610. The method then includes generating the dropped frame rate converted frame (i.e., the temporally modified frame) 308 based on the adjusted motion estimations from the detection of the missing source picture shown in block 612.

Figure 7:
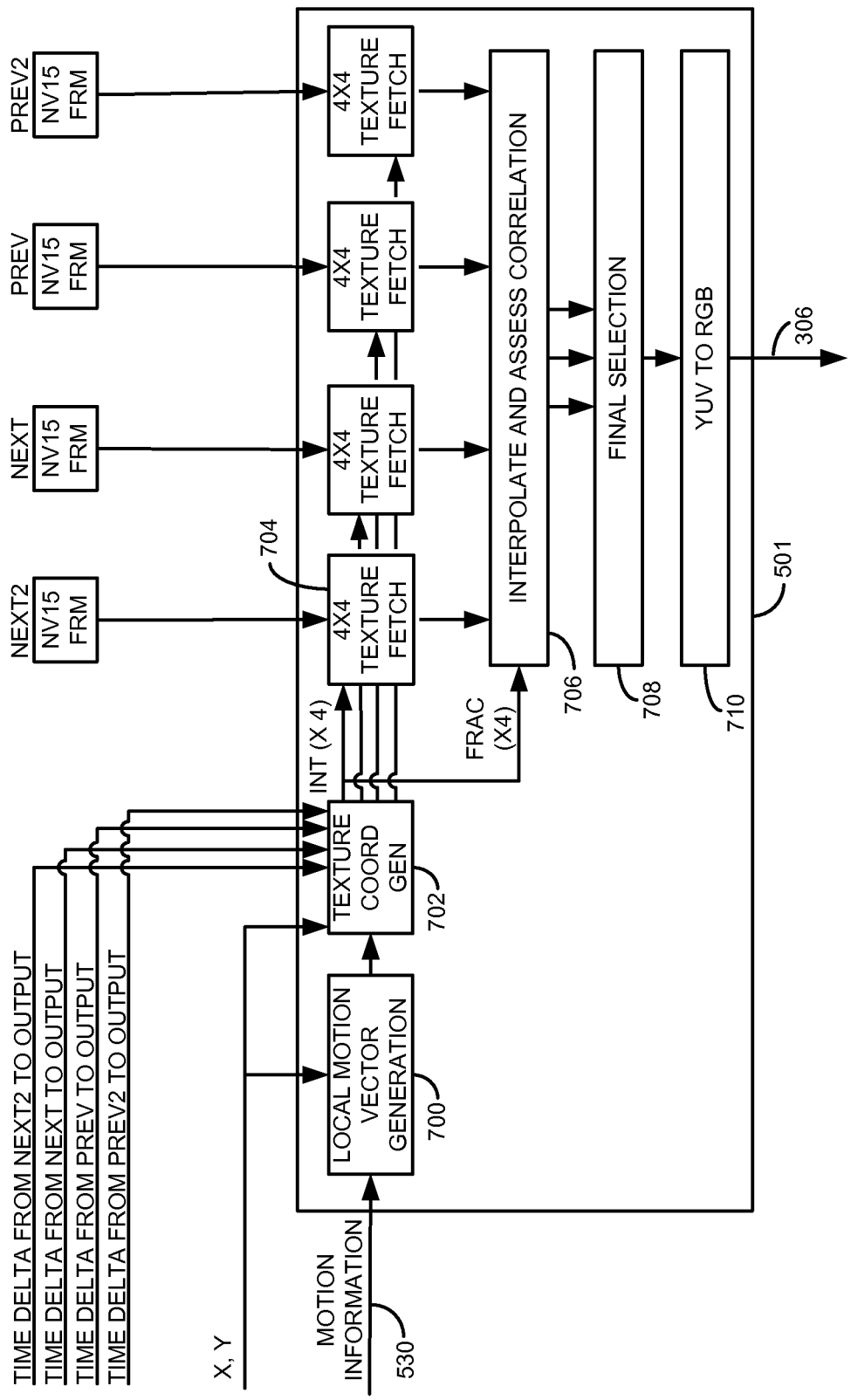
FIG. 7 is a block diagram illustrating one example of a frame rate converter in accordance with one example set forth in the disclosure.

FIG. 7 is a block diagram illustrating one example of the frame rate converter 501. As shown, in this example the frame converter includes a local motion vector generator 700, texture coordinate generator 702, a texture fetch block 704 each associated with each source frame, an interpolator and correlation block 706, a final selection block 708 and a YUV to RGB converter 710 if desired. The local motion vector generator 700 converts complex optical flow information for a large region into simplified motion information for a small region near x, y, as known in the art. At this stage a list describing motions of many possible objects may be reduced to a small list of "candidates" that most likely apply to the pixels near {x, y}. The texture coordinate generator 702 converts the simplified motion information into a motion vector that is specific to destination position {x, y}, as known in the art. The texture fetch coordinator 704 fetches pixels (or pels) from specified texture coordinates. This requires the integer portion of x, y. The interpolator block is well known and refers to making new pixels using nearby pixels in space and time. This requires the fractional component of x,y. Assess correlation means that the auto-correlation of the input pixels is determined (i.e. do they seem to agree with each other). The pixel selection block 708 selects pixels by assigning a weight to each interpolated value based on correlation. Better correlation means more weight. Relatively poor correlation can mean no weight. Output=SumOf(Pixel[i]*Weight[i])/SumOf(Weight[i]) where I is from 0 to 2 if there are three candidate motion vectors. The color conversion block 710 converts the pixel values from YUV space to RGB space if desired for output to a display or other process. It will be recognized that the blocks and operations may be implemented using any suitable logic including one or more programmed processors with suitable storage or by discrete logic, state machines or any other suitable logic.

Some examples of dropped frame replacement detection techniques are set forth below. In each, appropriate temporal correction factors are produced which will allow translation of motion vector measurements (between valid frames) into applied motion vectors (between a frame that is valid and a frame to create).

Detection of an invalid frame will be discussed with respect to Table 1.

TABLE 1

| Frame | Timestamp | Validity |
|---|---|---|
| 1 | 41.67 | TRUE |
| 2 | 83.34 | TRUE |
| 3 | 125.01 | TRUE |
| 4 | 166.68 | TRUE |
| 5 | 208.35 | TRUE |
| 6 | 250.02 | TRUE |
| 7 | 291.69 | TRUE |
| 8 | 333.36 | TRUE |
| 9 | 375.03 | TRUE |
| 10 | 416.7 | TRUE |
| 11 | 458.37 | FALSE |
| 12 | 500.04 | TRUE |
| 13 | 541.71 | TRUE |
| 14 | 583.38 | TRUE |
| 15 | 625.05 | TRUE |
| 16 | 666.72 | TRUE |
| 17 | 708.39 | TRUE |
| 18 | 750.06 | TRUE |
| 19 | 791.73 | TRUE |

In this case motion estimates involving the invalid frame are also likely to be invalid and/or misleading. In one embodiment they could be generated anyway, and an attempt to verify them could be employed. The motion estimates could be used if they appear to be consistent with other motion estimates. In another embodiment obtaining these estimates could be foregone and the frame rate converter works only with the estimates gathered between adjacent valid frames. This will temporarily leave some motion estimation related resources in an idle state. In another embodiment a motion estimate spanning the missing frame (making use of the idle resources) could be estimated. This "spanned" estimate could be a different kind of search than the typical non-spanned estimate. For example, since one "spanned" estimate will replace two "adjacent" estimates, and since it is expected that objects in the scene will have travel further in the spanned case, the spanned estimate could have a larger search range.

To make use of a spanned estimate, a temporal correction factor is used that allows to account for the fact that it represents a larger span of time than the time associated with adjacent image motion estimates. To illustrate, since frame 11 is invalid, estimates between valid frames would have different "delta time" values: 9 and 10 (dt=41.67), 10 and 12 (dt=83.34), 12 and 13 (dt=41.67). These 'dt' factors for the source frames will be needed later to translate motion estimates as the motion vectors are refined, checked for spatial and temporal consistency, and then used for video processing that involves motion compensation. For example, if the invalid frame 11 is synthesized, it would begin by determining the delta time between 10 and 11 id (dt=41.67). The motion estimates between 10 and 12 are converted into motion vectors that would be useful for motion compensation using their corresponding dt values.

As another example, detection of a time stamp discontinuity will be described with respect to Table 2.

TABLE 2

| Frame | Timestamp | Validity | Timestamp Delta | Action |
|---|---|---|---|---|
| 1 | 41.67 | TRUE | | |
| 2 | 83.34 | TRUE | 41.67 | |
| 3 | 125.01 | TRUE | 41.67 | |
| 4 | 166.68 | TRUE | 41.67 | |
| 5 | 208.35 | TRUE | 41.67 | |
| 6 | 250.02 | TRUE | 41.67 | |
| 7 | 291.69 | TRUE | 41.67 | |
| 8 | 333.36 | TRUE | 41.67 | |
| 9 | 375.03 | TRUE | 41.67 | |
| 10 | 416.7 | TRUE | 41.67 | |
| 11 | 458.37 | TRUE | 41.67 | |
| 12 | 541.71 | TRUE | 83.34 | Insert Frame |
| 13 | 583.38 | TRUE | 41.67 | |
| 14 | 625.05 | TRUE | 41.67 | |
| 15 | 666.72 | TRUE | 41.67 | |
| 16 | 708.39 | TRUE | 41.67 | |
| 17 | 750.06 | TRUE | 41.67 | |
| 18 | 791.73 | TRUE | 41.67 | |
| 19 | 833.4 | TRUE | 41.67 | |

In this case, an invalid frame is not received but rather it is deduced that a frame was dropped from a discontinuity in the timestamps. A preferred embodiment for this deduction involves fitting a line (y=mx+b) to 'n' timestamps before the current one where y is "time" and x is "frame number". If the current time stamp does not fall on the line (within a certain margin of error) then it is assumed that at least one frame is missing. It can be determined how many frames were dropped by substituting the current timestamp's time into the equation and solving for the frame number of the current frame. The missing frame number(s) can then be "created" (in a table) and marked as an invalid frame(s). Then some of the same techniques in the section above can be similarly employed.

As another example, detection of an object movement or change discontinuity will be described.

It is possible the timestamp information does not exist or is untrustworthy. In this case it may be necessary to apply statistical methods to other data to determine if one or more frames were dropped. For example, the frame rate converter can fit a line to one or more parameters associated with the object's motion. Typically an object's motion will be described by one or more of: x translation, y translation, rotation, change in size, change in skew. It should be noted that an "object" can include the whole scene or part of it. It is also possible to track more than one object. There are other measurable values that can be used for this algorithm (such as changing scene brightness) which are not preferred only since they are generally not observed and measured by a typical motion estimator. Any measureable parameter that changes in a predictable way for enough frames to fit a line to can suffice. Since there are several parameters and there could be multiple objects, it makes sense to apply the statistical techniques to as many values as are available. If there are statistically relevant results that indicate one (or more) missing images in the sequence then the missing frame number(s) can be "created" as described in (2).

Stated another way, in one example, the frame rate converter creates a sequence of output frames from a series of input images annotated with image description information wherein in a first mode of operation a complete set of images at regularly spaced intervals will be provided and in a second mode an incomplete set of images (at least one missing or corrupted image) will be provided by the decoder. In the second mode of operation the frame rate convertor adapts to the existence of the missing or corrupted image (frame) by creating output images from a different set of input images and annotated image description information than it used in the first mode. The frame rate convertor will change between modes of operation in response to information indicating or an analysis that determines the presence of a corrupted or missing input image.

Also, integrated circuit design systems (e.g. work stations) are known that create integrated circuits based on executable instructions stored on a computer readable memory such as but not limited to CDROM, RAM, other forms of ROM, hard drives, distributed memory etc. The instructions may be represented by any suitable language such as but not limited to hardware descriptor language or other suitable language. As such, the logic (e.g., circuits) described herein may also be produced as integrated circuits by such systems. For example an integrated circuit may be created for use in a display system using instructions stored on a computer readable medium that when executed cause the integrated circuit design system to create an integrated circuit that is operative to detect a presence of a change in encryption status of video information in a video stream and notify a viewer that new content is available or unavailable based on the detection of the change in encryption status of the video information. Integrated circuits having the logic that performs other of the operations described herein may also be suitably produced.

In another embodiment, the decoder, instead of indicating an entire frame is corrupted or repeated, provides corrupted picture indication information that indicates on a per-macroblock level, per-line level or other suitable frame segment level, which particular segments are corrupted or have been repeated. This may be done using any suitable error detection technique. This information may indicate, for example, that the portion or segment has been corrupted or dropped in the decoding process. In this embodiment, corresponding portions of an alternate support frame is used to reconstruct the corrupted parts or segments of the frames by using content from previous and next frames to reconstruct a dropped macroblock, for example, or a dropped strip. Accordingly, the frame converter a frame rate converter is operative in response to corrupted picture indication information, to replace at least one segment of a corrupted source frame with a temporally modified frame segment created from at least one alternate source frame. The corrupted picture indication information indicates that one or more segments of the source frame include a corrupted or dropped source frame segment that needs to be replaced by a corresponding segment from an alternate support frame.

Among other advantages, the apparatus and method allows dynamic detection of a dropped or corrupted source frame, or portion thereof, from a decoder and produces the dropped frame rate converted frame by effectively creating the missing source picture based on analysis from past and future frames one of which includes a non-neighboring frame by adjusting motion estimations using the analysis of the uncorrupted source frames. Accordingly, a smoother and more accurate image may be provided for a video playback or presentation device or devices. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. An apparatus comprising:
a frame rate converter operative to generate a corrupted picture indication information indicating a corrupted or repeated source frame, and to adaptively create a plurality of frame rate converted frames by using a plurality of alternate source frames output from a decoder instead of using a replacement source frame, the plurality of alternate source frames used to create a frame rate converted frame in the plurality of frame rate converted frames affected by the corrupted or repeated source frame including at least a neighboring previous source frame and a non-neighboring future source frame with respect to the frame rate converted frame, as well as a previous source frame prior to the neighboring previous source frame and a future source frame subsequent to the non-neighboring future source frame, wherein the neighboring previous source frame and the non-neighboring future source frame with respect to the frame rate converted frame are non-sequential, the neighboring previous source frame and the previous source frame prior to the neighboring previous source frame are sequential, and the non-neighboring future source frame and the future source frame subsequent to the non-neighboring future source frame are sequential; and
wherein the frame rate converter is operative to create the plurality of frame rate converted frames by generating motion vector information using the plurality of alternate source frames, and wherein the frame rate converter is operative to output the plurality of frame rate converted frames to a display.

2. The apparatus of claim 1 wherein the frame rate converter receives the corrupted picture indication information from the decoder and selects neighboring source frames for use in producing a plurality of normal frame rate converted frames during a normal mode and switches to adaptively creating the plurality of frame rate converted frames during another mode.

3. The apparatus of claim 1 comprising the display, the display operatively coupled to the frame rate converter, and operative to display the plurality of frame rate converted frames.

4. The apparatus of claim 2 wherein the frame rate converter is operative to generate the plurality of frame rate converted frames by generating motion estimation information using the plurality of alternate source frames and by generating motion vector information based on the motion estimation information.

5. The apparatus of claim 1 comprising the decoder, operatively coupled to the frame rate converter, and operative to decode an encoded stream of frames and to output a decoded series of frames as the source frames for the frame rate converter, wherein the decoder is operative to generate the corrupted picture indication information based on a determination that a dropped frame condition occurred or that a corrupted frame was produced by the decoder.

6. The apparatus of claim 4 wherein the frame rate converter is operative to adjust the motion vector information to obtain pixel information from an alternate source frame that corresponds to pixel information from a missing or corrupted frame to use to generate the frame rate converted frame.

7. The apparatus of claim 2 wherein the frame rate converter returns to the normal mode in response to generating the plurality of frame rate converted frames.

8. The apparatus of claim 5 comprising memory operatively coupled to the decoder and to the frame rate converter that stores at least four source frames for the frame rate converter.

9. A method for producing a plurality of frame rate converted frame from a plurality of alternate source frames from a decoder comprising:
in response to generating a corrupted picture indication information indicating a corrupted or repeated source frame, adaptively creating the plurality of frame rate converted frames by using the plurality of alternate source frames output from the decoder instead of using a replacement source frame, the plurality of alternate source frames used to create a frame rate converted frame in the plurality of frame rate converted frames affected by the corrupted or repeated source frame including at least a neighboring previous source frame and a non-neighboring future source frame with respect to the frame rate converted frame, as well as a previous source frame prior to the neighboring previous source frame and a future source frame subsequent to the non-neighboring future source frame, wherein the neighboring previous source frame and the non-neighboring future source frame with respect to the frame rate converted frame are non-sequential, the neighboring previous source frame and the previous source frame prior to the neighboring previous source frame are sequential, and the non-neighboring future source frame and the future source frame subsequent to the non-neighboring future source frame are sequential;
creating the plurality of frame rate converted frame by generating motion vector information using the plurality of alternate source frames; and
outputting the plurality of frame rate converted frames to a display.

10. The method of claim 9 comprising selecting neighboring source frames for use in producing a plurality of normal frame rate converted frame during a normal mode and switching to adaptively creating the plurality of frame rate converted frames in response to the corrupted picture indication information.

11. The method of claim 10 comprising generating the plurality of frame rate converted frames by generating motion estimation information using the plurality of alternate source frames and by generating motion vector information based on the motion estimation information.

12. The method of claim 9 comprising decoding an encoded stream of frames and outputting a decoded series of frames as the plurality of source frames for frame rate conversion, and generating the corrupted picture indication information based on a determination that a dropped frame condition occurred or that a corrupted frame was produced by the decoder.

13. The method of claim 11 comprising adjusting the motion vector information to obtain pixel information from an alternate source frame that corresponds to pixel information from a missing or corrupted frame to use to generate the frame rate converted frame.

14. The method of claim 10 comprising returning to the normal mode in response to generating the plurality of frame rate converted frames.

15. A non-transitory storage medium that contains executable instructions that when executed causing an integrated circuit design system to produce an integrated circuit that is operative to:

in response to generating a corrupted picture indication information indicating a corrupted or repeated source frame, adaptively create a plurality of frame rate converted frames by using a plurality of alternate source frames output from a decoder instead of using a replacement source frame, the plurality of alternate source frames used to create a frame rate converted frame in the plurality of frame rate converted frames affected by the corrupted or repeated source frame including at least a neighboring previous source frame and a non-neighboring future source frame with respect to the frame rate converted frame, as well as a previous source frame prior to the neighboring previous source frame and a future source frame subsequent to the non-neighboring future source frame, wherein the neighboring previous source frame and the non-neighboring future source frame with respect to the frame rate converted frame are non-sequential, the neighboring previous source frame and the previous source frame prior to the neighboring previous source frame are sequential, and the non-neighboring future source frame and the future source frame subsequent to the non-neighboring future source frame are sequential;

create the plurality of frame rate converted frames by generating motion vector information using the plurality of alternate source frames; and output the plurality of frame rate converted frames to a display.

16. The apparatus of claim 1 wherein the frame rate converter is operative to generate the corrupted picture indication information based on at least one of: detecting a time stamp discontinuity among time stamps from each of a plurality of the source frames, based on object movement information and based on image change discontinuity among a plurality of source images that are determined not to be corrupted or missing.

17. The method of claim 9 wherein generating the corrupted picture indication information is based on at least one of: detecting a time stamp discontinuity among time stamps from each of the plurality of source frames, based on object movement information and based on image change discontinuity among a plurality of source images that are not determined to be corrupted or missing.

* * * * *